United States Patent
Aizawa et al.

(10) Patent No.: US 10,071,631 B1
(45) Date of Patent: Sep. 11, 2018

(54) AUTOMATIC TWO-WHEELED VEHICLE DISPLAY DEVICE

(71) Applicant: Mitsubishi Electric Corporation, Tokyo (JP)

(72) Inventors: Hiroshi Aizawa, Tokyo (JP); Hiroyuki Ono, Tokyo (JE)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/671,282

(22) Filed: Aug. 8, 2017

(30) Foreign Application Priority Data

Apr. 26, 2017 (JP) .................................. 2017-086882

(51) Int. Cl.
| | |
|---|---|
| *B60Q 1/00* | (2006.01) |
| *B60K 35/00* | (2006.01) |
| *G07C 5/08* | (2006.01) |
| *B60K 37/02* | (2006.01) |

(52) U.S. Cl.
CPC ............ *B60K 35/00* (2013.01); *G07C 5/0825* (2013.01); *B60K 37/02* (2013.01); *B60K 2350/2039* (2013.01); *B60K 2350/352* (2013.01); *B60K 2350/962* (2013.01); *B60K 2350/965* (2013.01)

(58) Field of Classification Search
CPC .................... B60K 35/00; B60K 37/02; B60K 2350/2039; B60K 2350/352; B60K 2350/962; B60K 2350/965; G07C 5/0825
USPC ...................................................... 340/461
See application file for complete search history.

(56) References Cited

U.S. PATENT DOCUMENTS

| | | | | |
|---|---|---|---|---|
| 7,966,123 B2* | 6/2011 | Watanabe | ............. | B60K 37/02 340/439 |
| 8,830,043 B2* | 9/2014 | Sato | ........................ | B60K 37/02 340/425.5 |
| 9,818,206 B2* | 11/2017 | Masuya | ................ | G06T 11/001 |
| 2001/0040534 A1 | 11/2001 | Ohkawara et al. | | |

(Continued)

FOREIGN PATENT DOCUMENTS

| | | |
|---|---|---|
| JP | 11078611 A | 3/1999 |
| JP | 2001315547 A | 11/2001 |

(Continued)

OTHER PUBLICATIONS

Communication dated Apr. 17, 2018, from the Japanese Patent Office in counterpart application No. 2017086882.

*Primary Examiner* — Zhen Y Wu
(74) *Attorney, Agent, or Firm* — Sughrue Mion, PLLC; Richard C. Turner (57) ABSTRACT

An automatic two-wheeled vehicle display device is such that, while warning information is being displayed in a second display region, a CPU changes a background color gradation of the second display region to a first gradation (for example, white) for a first setting period t1, gradually increases backlight luminosity to reach a maximum value (100%) in a third setting period t3 that is shorter than the first setting period t1, and maintains the backlight luminosity at the maximum value (t1=t3+t4) for a fourth setting period t4. Subsequently, the CPU changes the background color gradation of the second display region to a second gradation (for example, black) for a second setting period t2, and adjusts the backlight luminosity to a luminosity the same as that in a normal mode (for example, 20%).

8 Claims, 7 Drawing Sheets

(56) References Cited

U.S. PATENT DOCUMENTS

| | | | | |
|---|---|---|---|---|
| 2008/0252579 A1* | 10/2008 | Kato | .................... | B60K 35/00 |
| | | | | 345/87 |
| 2011/0090074 A1* | 4/2011 | Kuno | .................... | B60K 35/00 |
| | | | | 340/438 |
| 2011/0175754 A1* | 7/2011 | Karpinsky | ............. | B60K 35/00 |
| | | | | 340/963 |
| 2013/0141226 A1* | 6/2013 | Agnew | ................. | B60Q 11/00 |
| | | | | 340/425.5 |
| 2016/0048050 A1* | 2/2016 | Okada | .................... | G01D 11/28 |
| | | | | 349/58 |
| 2016/0265927 A1* | 9/2016 | Chen | ..................... | G06Q 50/00 |

FOREIGN PATENT DOCUMENTS

| | | | |
|---|---|---|---|
| JP | 2007041404 | A | 2/2007 |
| JP | 2007139609 | A | 6/2007 |
| JP | 2008241645 | A | 10/2008 |
| JP | 2010070078 | A | 4/2010 |
| JP | 4911315 | B2 | 4/2012 |
| JP | 2013032030 | A | 2/2013 |
| JP | 2015085752 | A | 5/2015 |
| JP | 2015168280 | A | 9/2015 |

\* cited by examiner

AUTOMATIC TWO-WHEELED VEHICLE DISPLAY DEVICE

BACKGROUND OF THE INVENTION

Field of the Invention

The present invention relates to an automatic two-wheeled vehicle display device that displays vehicle warning information as necessary, and in particular, relates to a display device having a liquid crystal indicator equipped with a backlight.

Description of the Background Art

An existing automatic two-wheeled vehicle is such that a warning light that informs a driver of a vehicle abnormality is installed in a meter as a lamp or LED. Also, a vehicle-use display device that displays as necessary an image representing a warning using permeation of light from a backlight is disclosed in Patent Document 1. This prior art is such that when a warning screen representing a warning is displayed on a liquid crystal indicator, the warning screen is displayed with backlight luminosity set to a maximum value, regardless of backlight luminosity manually adjusted using a luminosity adjustment unit.

Patent Document 1: Japanese Patent No. 4,911,315

Although it is often the case that an existing automatic two-wheeled vehicle warning light is installed in a meter as a lamp or LED, there is a problem in that a driver of an automatic two-wheeled vehicle often looks momentarily at the meter while traveling, and does not notice an illuminated warning light. In the same way, when a meter is configured of a liquid crystal indicator having a liquid crystal display that uses a TFT and a backlight, there is a problem in that a driver does not notice warning information displayed on the screen.

In Patent Document 1, visibility of the warning screen is secured by the backlight luminosity being set to the maximum value when the warning screen is displayed on the liquid crystal indicator, but there is concern that the driver will be dazzled when the backlight luminosity momentarily reaches the maximum value at night. Also, as the driver of an automatic two-wheeled vehicle does not often check the meter, there is a possibility of the driver not noticing a warning display even though the backlight luminosity momentarily reaches the maximum value. In particular, as the backlight luminosity is set on the high side in daytime anyway, there is a high possibility of the driver not noticing a warning display even though the backlight luminosity reaches the maximum value.

SUMMARY OF THE INVENTION

The invention, having been contrived in order to resolve the heretofore described kinds of problem, has an object of providing an automatic two-wheeled vehicle display device such that a driver can be caused to recognize a display of vehicle warning information safely and swiftly.

An automatic two-wheeled vehicle display device according to the invention includes an indicator having a display region, including a first display region in which vehicle information is displayed and a second display region in which vehicle warning information is displayed, and a backlight that irradiates the display region with light, and a processor that adjusts a luminosity of the backlight based on a brightness of external light detected by an illuminance sensor, adjusts a gradation and brightness of a background color of the display region of the indicator, acquires vehicle warning information, and displays the warning information in the second display region, wherein the processor, while warning information is being displayed in the second display region, causes a background color of the second display region to be displayed flashing by repeatedly adjusting a gradation of the background color of the second display region to a first gradation that differs from a gradation of a background color of the first display region for a first setting period, and subsequently adjusting the gradation of the background color of the second display region to a second gradation that differs from the first gradation for a second setting period.

According to the automatic two-wheeled vehicle display device according to the invention, a background color gradation of a second display region is changed between a first gradation and second gradation while warning information is being displayed in the second display region, whereby the background color of the second display region is displayed flashing. Because of this, a driver is not dazzled when driving at night, and the driver can be caused to recognize a display of vehicle warning information safely and swiftly, whether in the daytime or at night.

The foregoing and other objects, features, aspects and advantages of the invention will become more apparent from the following detailed description of the invention when taken in conjunction with the accompanying drawings.

DETAILED DESCRIPTION OF THE PREFERRED EMBODIMENTS

First Embodiment

Figure 1:
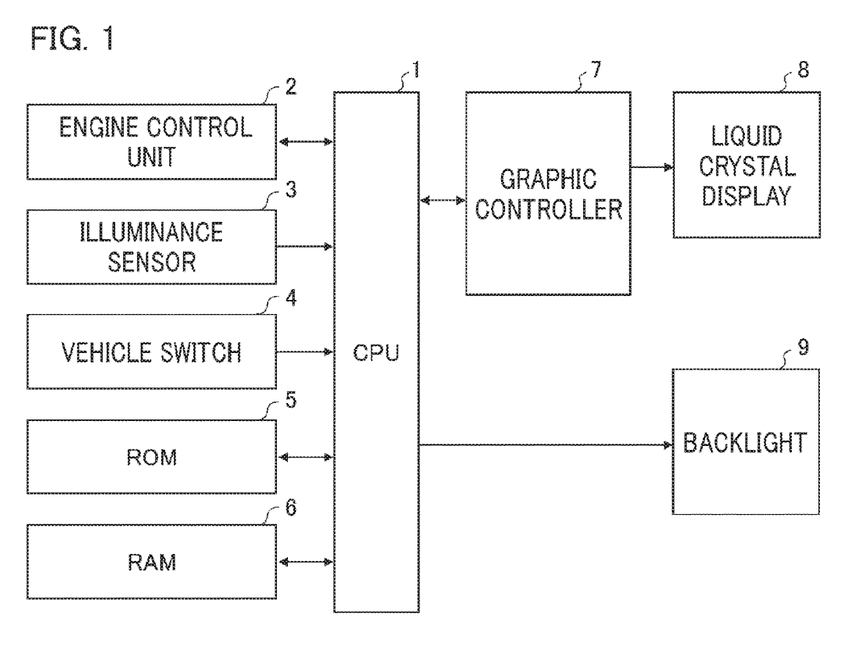
FIG. 1 is a block diagram showing a configuration of an automatic two-wheeled vehicle display device according to a first embodiment of the invention.
Figure 2:
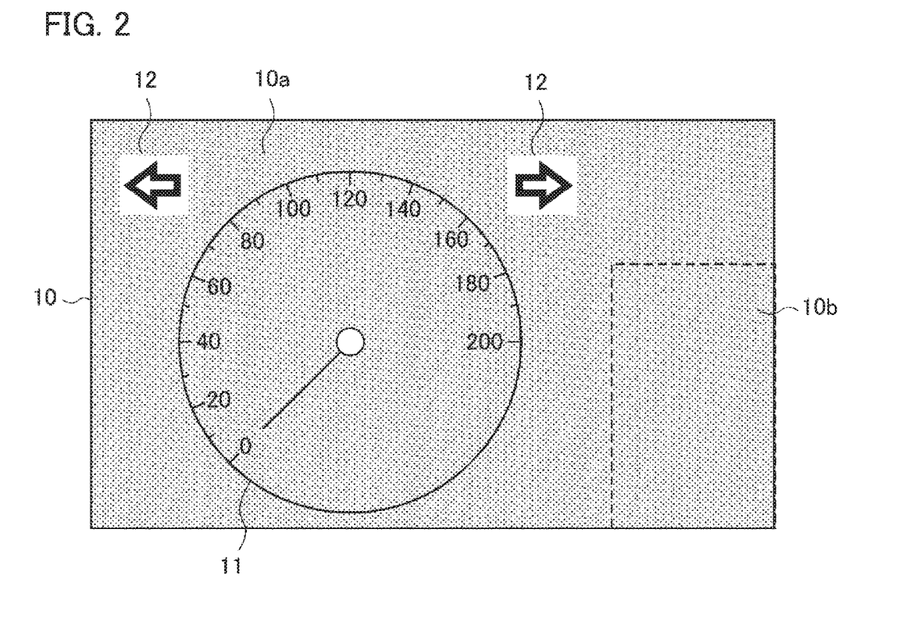
FIG. 2 is a diagram showing a normal mode state of the automatic two-wheeled vehicle display device according to the first embodiment of the invention.
Figure 3:
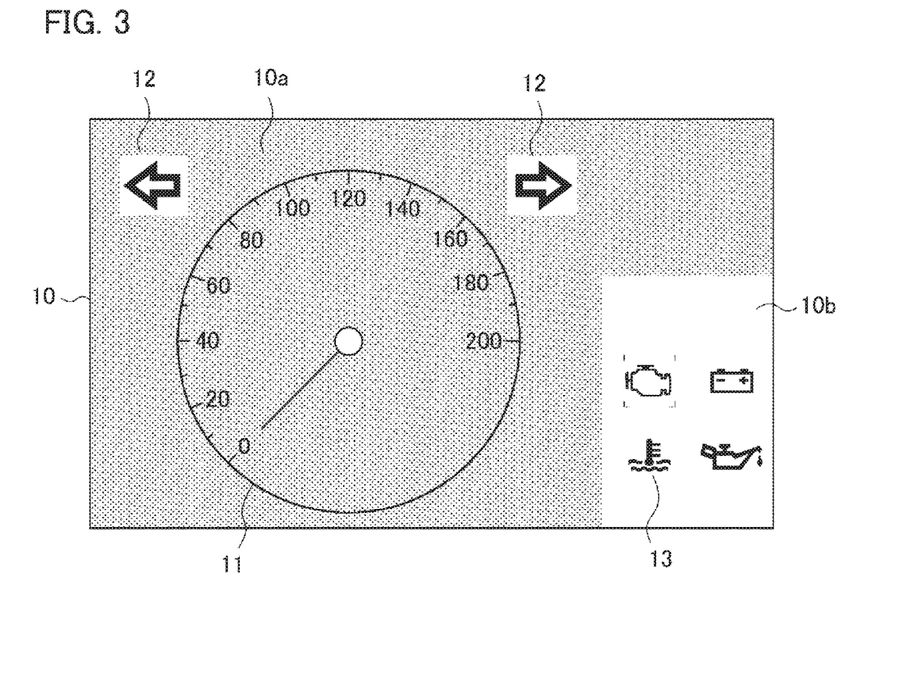
FIG. 3 is a diagram showing a state in a first setting period of a warning display mode of the automatic two-wheeled vehicle display device according to the first embodiment of the invention.
Figure 4:
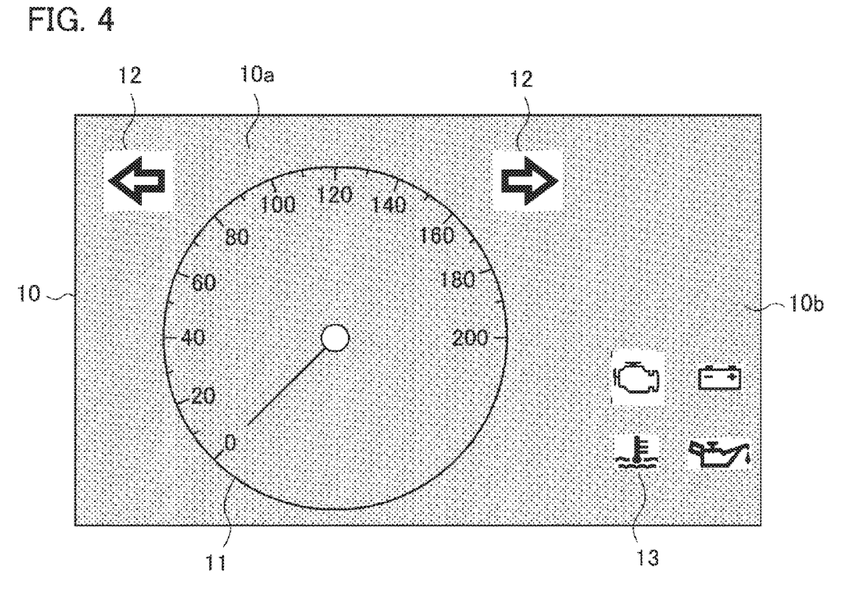
FIG. 4 is a diagram showing a state in a second setting period of the warning display mode of the automatic two-wheeled vehicle display device according to the first embodiment of the invention.

Hereafter, based on the drawings, an automatic two-wheeled vehicle display device according to a first embodiment of the invention will be described. FIG. 1 is a block diagram showing a configuration of the automatic two-wheeled vehicle display device according to the first embodiment, and FIGS. 2 to 4 are diagrams showing a display region of the automatic two-wheeled vehicle display device according to the first embodiment, wherein FIG. 2 shows a state in a normal mode, and FIGS. 3 and 4 show a state in a warning display mode. In FIGS. 2 to 4, for the sake of convenience, a black background color is represented by dots, and a speedometer 11 and the like are represented by black lines, but the speedometer 11 and the like are not actually represented by black lines. In the drawings, the same reference signs are allotted to identical or corresponding portions.

As shown in FIG. 1, the automatic two-wheeled vehicle display device according to the first embodiment is configured to include a central processing unit (CPU) 1, which is a processor, an engine control unit 2, an illuminance sensor 3, a vehicle switch 4, a read only memory (ROM) 5, a random access memory (RAM) 6, and a graphic controller 7, and includes as an indicator a liquid crystal indicator having a liquid crystal display 8 and backlight 9.

The CPU 1 has a backlight luminosity adjustment unit that adjusts luminosity of the backlight 9 based on brightness of external light detected by the illuminance sensor 3, a background color adjustment unit, which selects a display image to be displayed on the liquid crystal display 8 from among multiple kinds of display image of differing background color gradation and brightness stored in the ROM 5 and adjusts the background color gradation and brightness of the display region 10 of the liquid crystal display 8, a vehicle information display unit, which acquires vehicle information from the engine control unit 2 and displays the vehicle information, and a warning information display unit, which acquires vehicle warning information from the engine control unit 2 or another electronic control unit and displays the warning information.

The illuminance sensor 3 is a sensor that detects a degree (Lx) of external light brightness, that is, brightness of a surface illuminated by external light. The backlight luminosity adjustment unit of the CPU 1 controls the luminosity of the backlight 9 (hereafter referred to as backlight luminosity) based on an external light brightness acquired by processing a value detected by the illuminance sensor 3. The backlight luminosity indicates the brightness ($cd/m^2$) of the backlight 9, which is a light source, and is normally set to be high (bright) in the light day time, and set to be low (dim) in the dark night time.

At a normal time (in the normal mode), the backlight luminosity is adjusted steplessly by the backlight luminosity adjustment unit of the CPU 1 in accordance with the external light brightness detected by the illuminance sensor 3. Alternatively, the backlight luminosity may be set in around three steps, those being a morning mode, a daytime mode, and a night mode, in accordance with the external light brightness.

The vehicle switch 4 is installed in a steering wheel portion of an automatic two-wheeled vehicle. A function of the vehicle switch 4 will be described hereafter in a third embodiment. The ROM 5 is a non-volatile memory such as a flash ROM. Multiple kinds of vehicle information display image, warning display image, and the like, of differing background color gradation and brightness are stored together with a control program of the liquid crystal display 8 in the ROM 5. The RAM 6 is a volatile memory whose memory details are deleted when a power supply is turned off, and which temporarily stores data of the ROM 5 when a vehicle power supply is turned on.

The liquid crystal display 8 is such that an image is displayed in the display region 10 by light emitted from the backlight 9 permeating the display region 10. As shown in FIGS. 2 to 4, the display region 10 has a first display region 10a, in which vehicle information is displayed, and a second display region 10b, in which vehicle warning information 13 is displayed. The speedometer 11, a direction indicator 12, and the like, are displayed in the first display region 10a, and the warning information 13, such as a check engine warning, battery voltage warning, water temperature warning, and engine oil warning, is displayed in the second display region 10b.

The vehicle information display unit of the CPU 1 acquires vehicle information from the engine control unit 2 using a controller area network (CAN), and displays the vehicle information in the first display region 10a of the liquid crystal display 8 via the graphic controller 7. The display region 10 at a normal time when no abnormality is occurring in the vehicle is in the normal mode shown in FIG. 2, and the warning information 13 is not displayed. In the normal mode, the background color gradation of the second display region 10b is set to be the same gradation as that of the background color of the first display region 10a.

Also, the warning information display unit of the CPU 1 acquires vehicle warning information from the engine control unit 2 using the CAN, and when the warning information needs to be displayed, displays a warning display image temporarily stored in the RAM 6 on the liquid crystal display 8 via the graphic controller 7 (the warning display mode). Other than the engine control unit 2, there is also a case in which warning information is acquired from another electronic control unit installed in order to control the vehicle.

While the warning information 13 is being displayed by the warning information display unit in the second display region 10b, the CPU 1 uses the background color adjustment unit to adjust the background color gradation of the second display region 10b to a first gradation differing from the background color gradation of the first display region 10a for a first setting period, as shown in FIG. 3. In the example shown in FIG. 3, the first gradation is set so that the background color of the second display region 10b becomes white.

Subsequently, for a second setting period, the CPU 1 adjusts the background color gradation of the second display region 10b to a second gradation differing from the first gradation, as shown in FIG. 4. In the example shown in FIG. 4, the second gradation is set so that the background color of the second display region 10b becomes black. The second gradation may be the same as the background color gradation of the second display region 10b in the normal mode (FIG. 2).

The second display region 10b becomes a flashing display by the display in the first gradation for the first setting period (FIG. 3) and the display in the second gradation for the second setting period (FIG. 4) being repeated until there is no longer a need for the warning information 13 to be displayed. The first setting period and second setting period are set in advance and stored in the ROM 5, with the first setting period being set to a length equal to or greater than that of the second setting period.

Background color gradation refers to a change in background color shading, and in the case of the liquid crystal display 8, background color gradation is digitalized in accordance with a number of shading steps prepared for each of colors red, green, and blue. In the case of a currently widespread general liquid crystal display, each of the colors red, green, and blue can be displayed in 256 steps (gradations), in which case 16,777,216 colors, which is 256 cubed, are colors that can be displayed. The color steps of the liquid crystal display 8 differ depending on liquid crystal specifications, and are not limited to 256 steps.

That is, the first gradation and second gradation include gradations of each of the colors red, green, and blue, and the background color is determined in accordance with each gradation. By red being adjusted to step 255, green to step 255, and blue to step 255 as the first gradation, the background color of the second display region 10b becomes white. In this case, by the background color gradation of the first display region 10a being adjusted to black by red being adjusted to step 0, green to step 0, and blue to step 0, visibility of the second display region 10b increases.

Also, by the background color of the second display region 10b being adjusted to black as the second gradation by red being adjusted to step 0, green to step 0, and blue to step 0, white and black are displayed alternately, and visibility increases owing to the contrast in background colors being at a maximum. However, as an advantage of a driver's attention being directed to the second display region 10b is obtained by causing the second display region 10b to flash in differing color gradations, the first gradation and second gradation are not particularly limited.

In the night-time normal mode, background color brightness is set to be low, and background color gradation set to be dark (for example, black), for both the first display region 10a and second display region 10b, because of which the driver's attention is more easily drawn by the background color first gradation and brightness of the second display region 10b being set to a color (for example, white) that is clearer and lighter than that of the first display region 10a in the warning display mode.

Meanwhile, in the daytime normal mode, it is often the case that the backlight luminosity is set to be high, and may even be at a maximum value. In this kind of case, there is a possibility of the driver not noticing even though the background color first gradation of the second display region 10b is set to a maximum (white) in the warning display mode. Because of this, the advantage of the driver's attention being directed to the second display region 10b is obtained by causing the background color of the second display region 10b in the warning display mode to change between the first gradation and second gradation.

Figure 5:
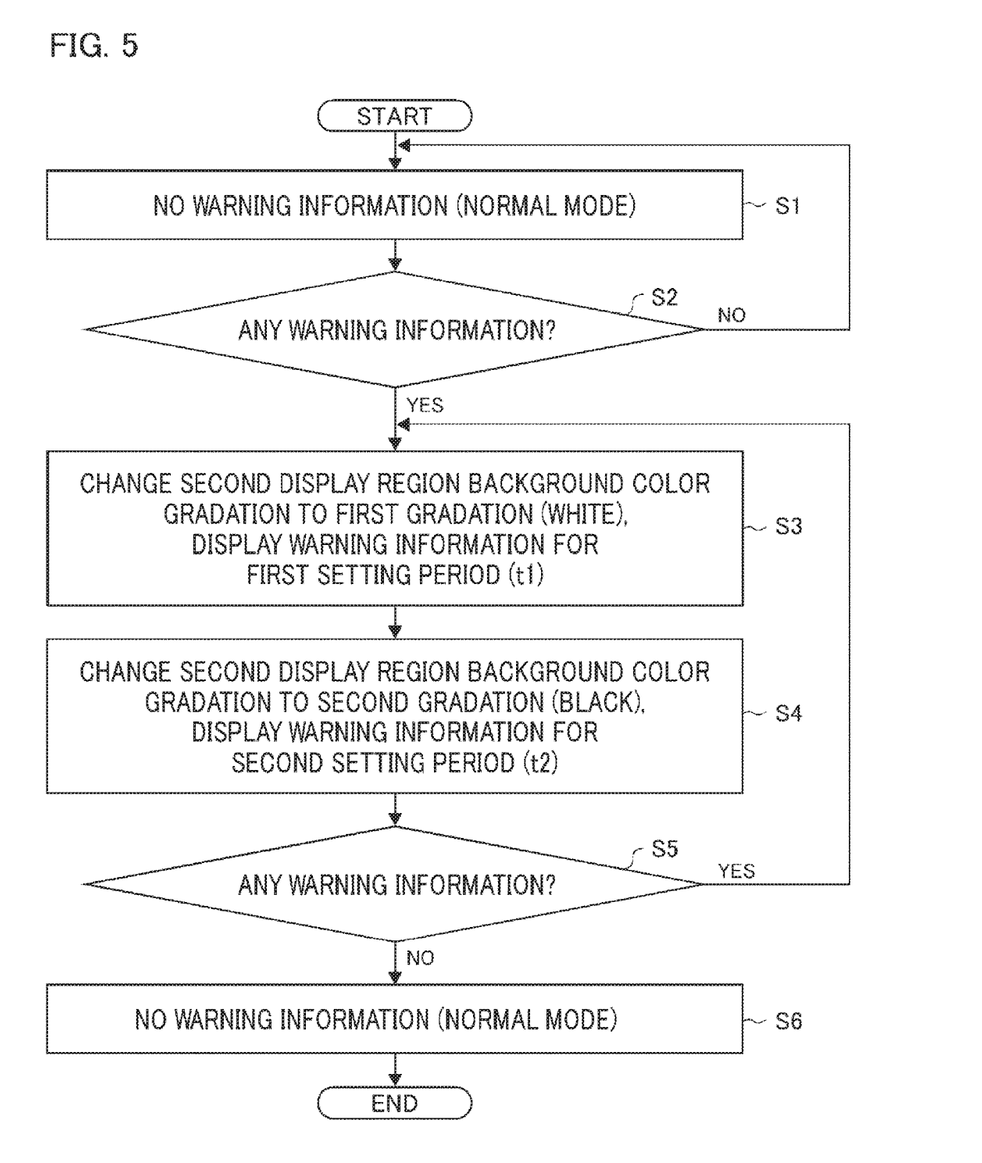
FIG. 5 is a diagram showing a flow of a warning information display process of the automatic two-wheeled vehicle display device according to the first embodiment of the invention.

A description will be given, using FIGS. 5 and 6, of a flow of a warning information display process of the display device according to the first embodiment. FIG. 5 is a flowchart showing the flow of the warning information display process of the display device according to the first embodiment, and FIG. 6 is a diagram illustrating a method of controlling background color gradation in the second display region of the display device.

In step S1 of FIG. 5, a normal mode image is displayed in the display region 10 of the liquid crystal display 8. When the CPU 1 acquires warning information from the engine control unit 2 in step S2 (YES), the process proceeds to step S3, and a warning display mode image is displayed.

Figure 6:
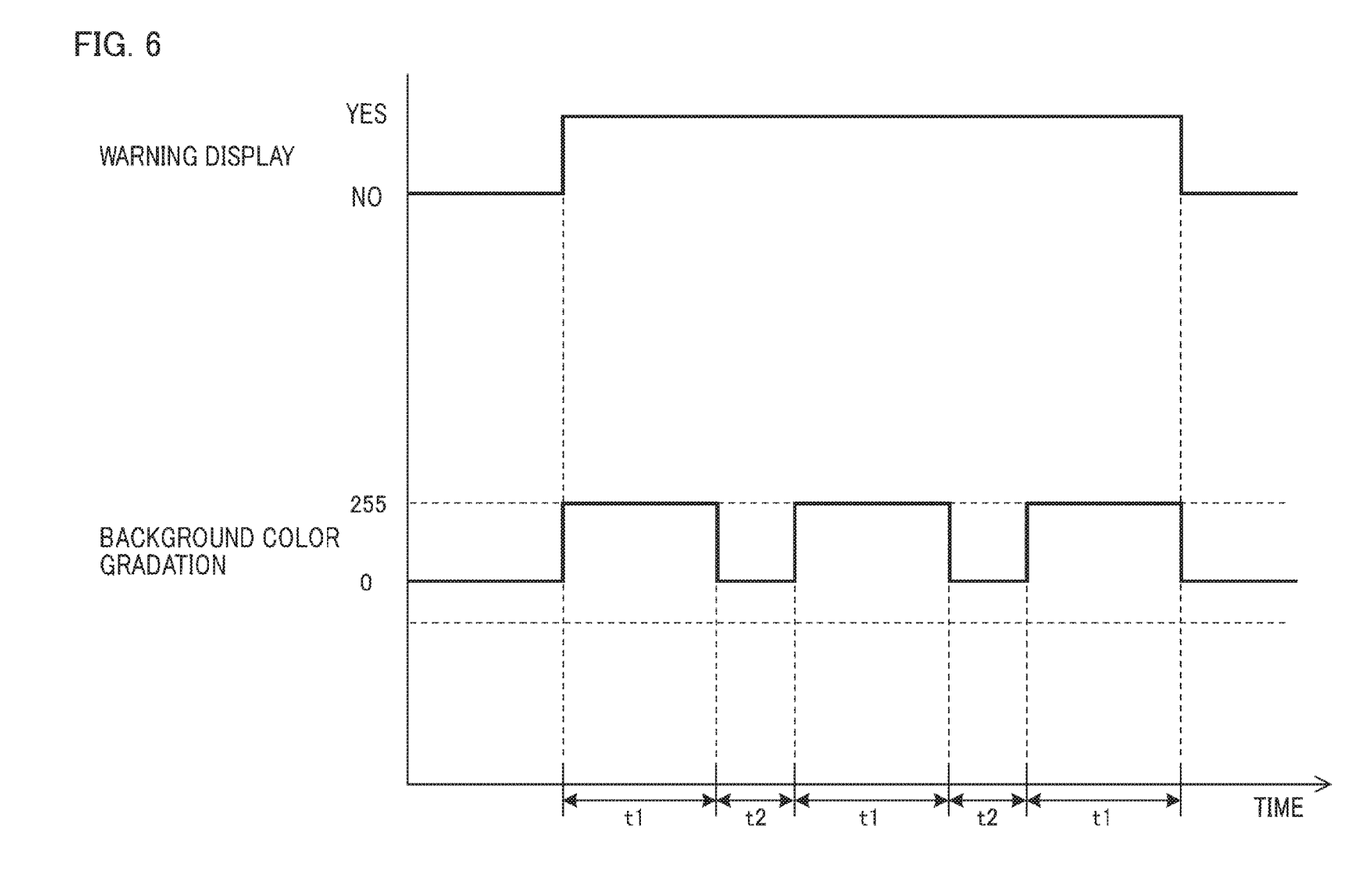
FIG. 6 is a diagram illustrating a method of controlling background color gradation in a second display region of the automatic two-wheeled vehicle display device according to the first embodiment of the invention.

In step S3, the background color gradation of the second display region 10b is changed to the first gradation, which differs from the background color gradation of the first display region 10a, and the warning information 13 (refer to FIG. 3) is displayed for the first setting period (t1 shown in FIG. 6). Continuing, in step S4, the background color gradation of the second display region 10b is changed to the second gradation, which differs from the first gradation, and the warning information 13 (refer to FIG. 4) is displayed for the second setting period (t2 shown in FIG. 6).

Regarding the lengths of the first setting period t1 and second setting period t2, it is desirable that the first setting period t1 is set to be longer than the second setting period t2, as shown in FIG. 6, or alternatively, that the first setting period t1 and second setting period t2 are set to be of the same lengths (t1≥t2). Also, in the example shown in FIG. 6, the first gradation of the second display region 10b background color is adjusted to white by red being adjusted to step 255, green to step 255, and blue to step 255, and the second gradation is adjusted to black by red being adjusted to step 0, green to step 0, and blue to step 0.

Continuing, when there is warning information in step S5 (YES), the process returns to step S3, and the warning display mode is continued. Step S3 and S4 are repeated until there is no longer any warning information in step S5. Because of this, the second display region 10b is a flashing display during the warning display mode. When there is no warning information in step S2 or step S5 (NO), the normal mode image is displayed.

According to the automatic two-wheeled vehicle display device according to the first embodiment, as heretofore described, the background color gradation of the second display region 10b is changed between the first gradation and second gradation while the warning information 13 is being displayed in the second display region 10b, whereby the background color of the second display region 10b is displayed flashing. Because of this, the driver is not dazzled when driving at night, and the driver can be caused to recognize a display of the vehicle warning information 13 safely and swiftly, whether in the daytime or at night.

Second Embodiment

As a configuration of an automatic two-wheeled vehicle display device according to a second embodiment of the invention is the same as in the first embodiment, FIG. 1 will be utilized, and a description of each portion will be omitted. In the first embodiment, the background color gradation of the second display region 10b is changed between the first gradation and second gradation during the warning display mode, whereby the background color of the second display region 10b is displayed flashing, but in the second embodiment, a control of backlight luminosity in the warning display mode is added.

While warning information is being displayed by the warning information display unit in the second display region 10b, the CPU 1 uses the backlight luminosity adjustment unit to gradually increase the backlight luminosity in a third setting period that is shorter than the first setting period, and after a maximum value is reached, maintains the backlight luminosity at the maximum value for a fourth setting period that is the difference between the first setting period and third setting period. For the succeeding second setting period, the CPU 1 instantaneously adjusts the backlight luminosity to a luminosity based on the external light brightness (normal mode backlight luminosity).

Compared to the daytime, the backlight luminosity is set to a low value at night, because of which there is a possibility of the driver being dazzled when the backlight luminosity instantaneously reaches the maximum value. Because of this, when the backlight luminosity is adjusted to the maximum value in the third setting period, the backlight luminosity is increased gradually in order that the driver is not dazzled. Meanwhile, when the backlight luminosity is adjusted from the maximum value to a luminosity based on the external light brightness for the second setting period, the backlight luminosity is instantaneously reduced because the driver is not dazzled. When the background color gradation of the second display region 10b is white, the backlight luminosity is adjusted to the maximum value, because of which the advantage of the driver noticing the display of the warning information 13 is further enhanced.

Also, the background color brightness of the second display region 10b may be changed from dark to bright every unit time in synchronization with the backlight luminosity. While warning information is being displayed in the second display region 10b by the warning information display unit, the CPU 1 uses the background color adjustment unit to gradually increase the background color brightness of the second display region 10b in the third setting period, and after a maximum value is reached, maintains the background color brightness of the second display region 10b at the maximum value for the fourth setting period, and adjusts the background color brightness of the second display region 10b to a minimum value for the succeeding second setting period.

Figure 7:
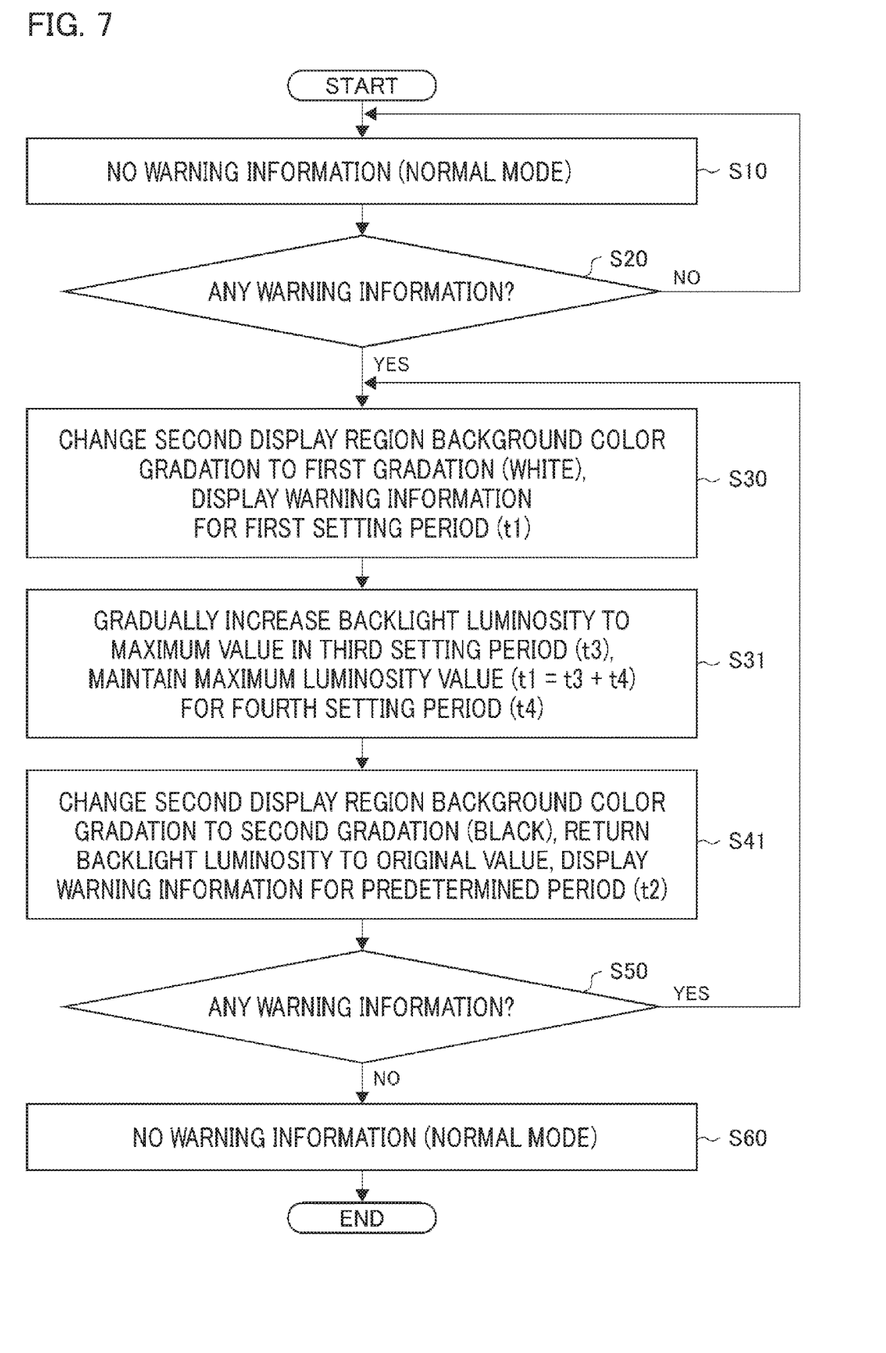
FIG. 7 is a diagram showing a flow of a warning information display process of an automatic two-wheeled vehicle display device according to a second embodiment of the invention.

A description will be given, using FIGS. 7 and 8, of a flow of a warning information display process in the display device according to the second embodiment. FIG. 7 is a flowchart showing the flow of the warning information display process in the display device according to the second embodiment, and FIG. 8 is a diagram illustrating a method of controlling background color gradation and brightness in the second display region of the display device, and backlight luminosity.

In step S10 of FIG. 7, a normal mode image is displayed in the display region 10 of the liquid crystal display 8. When the CPU 1 acquires warning information from the engine control unit 2 in step S20 (YES), the process proceeds to step S30, and a warning display mode image is displayed.

Figure 8:
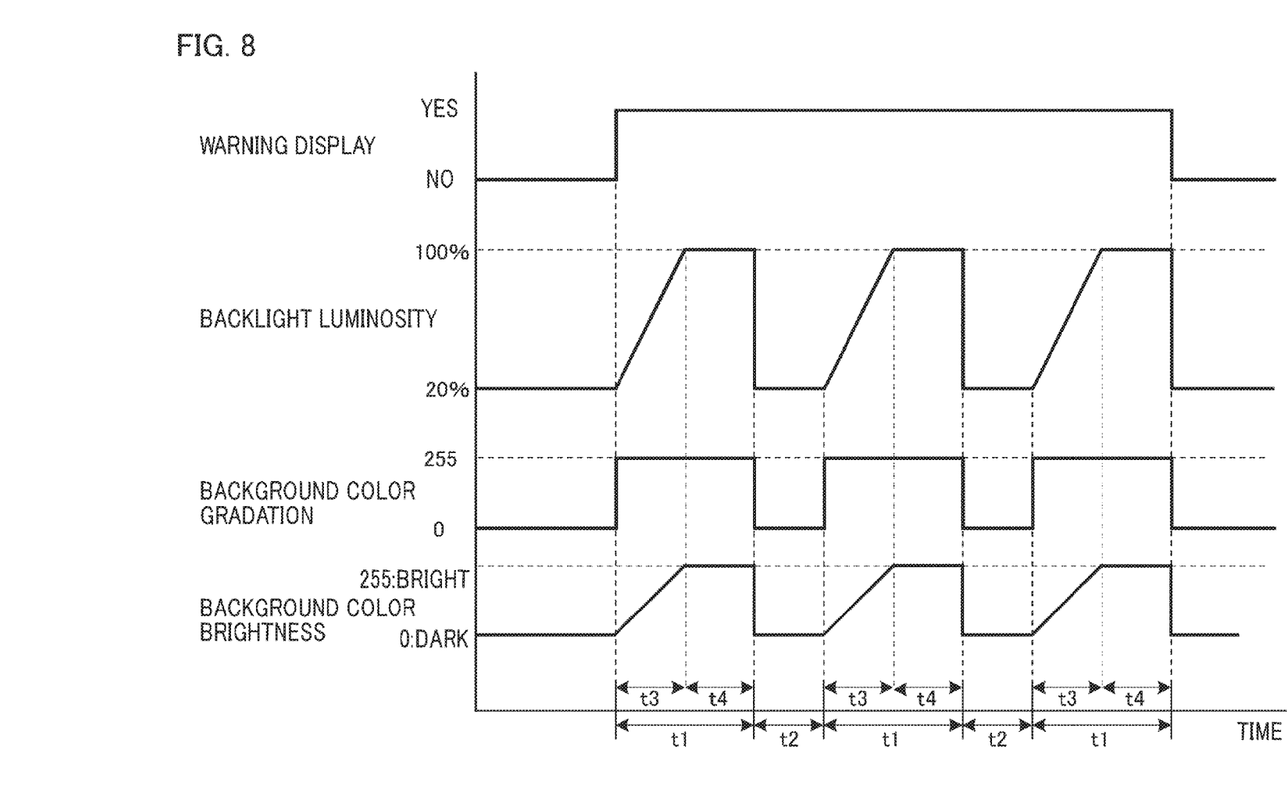
FIG. 8 is a diagram illustrating a method of controlling background color gradation and brightness in a second display region, and backlight luminosity, of the automatic two-wheeled vehicle display device according to the second embodiment of the invention.

In step S30, the background color gradation of the second display region 10b is changed to the first gradation (white), which differs from the background color gradation of the first display region 10a, and warning information is displayed for the first setting period (t1 shown in FIG. 8).

Continuing, in step S31, the backlight luminosity is gradually increased in the third setting period (t3 shown in FIG. 8), and after the maximum value (100%) is reached, the backlight luminosity is maintained at the maximum value for the fourth setting period (t4 shown in FIG. 8) (t1=t3+t4). The processes of step S30 and step S31 are carried out simultaneously. In the example shown in FIG. 8, the backlight luminosity is adjusted to 100% in the third setting period t3 by being increased by, for example, 5% every predetermined time interval.

Continuing, in step S41, the background color gradation of the second display region 10b is changed to the second gradation (black), the backlight luminosity is returned to the original value, and warning information is displayed for the second setting period (t2 shown in FIG. 8). When the fourth setting period t4 ends and the second setting period t2 is entered, the backlight luminosity is instantaneously returned to the backlight luminosity of the normal mode, as shown in FIG. 8. The backlight luminosity of the normal mode (20% here) is set based on the external light brightness detected by the illuminance sensor 3.

Also, in the example shown in FIG. 8, the background color brightness of the second display region 10b is gradually increased in synchronization with the backlight luminosity in the third setting period t3, and after the maximum value (step 255) is reached, the maximum value is maintained for the fourth setting period t4. That is, the timing at which the background color brightness reaches the maximum value and the timing at which the backlight luminosity reaches the maximum value coincide. When the fourth setting period t4 ends and the second setting period t2 is entered, the background color brightness is instantaneously returned to the minimum value (step 0). In the second setting period t2, the background color brightness is maintained at the minimum value (step 0).

According to the second embodiment, in addition to the same advantage as in the first embodiment, the backlight luminosity is gradually increased to the maximum value in the warning display mode, and maintained at the maximum value for a predetermined time, after which the backlight luminosity is instantaneously returned to the backlight luminosity of the normal mode, whereby the driver notices a display of the warning information 13 still more easily, without being dazzled. Also, visibility is further improved by the background color brightness reaching the maximum value at the timing at which the backlight luminosity reaches the maximum value.

Third Embodiment

As a configuration of an automatic two-wheeled vehicle display device according to a third embodiment of the invention is the same as in the first embodiment, FIG. 1 will be utilized, and a description of each portion will be omitted. In the third embodiment, a description will be given of the vehicle switch 4, which is a switch for the user to stop a flashing display of the background color of the second display region 10b in the warning display mode.

The vehicle switch 4 is installed in the steering wheel portion of the automatic two-wheeled vehicle, and the driver, when noticing a display of the warning information 13, can stop a flashing display of the background color of the second display region 10b by pressing the vehicle switch 4. However, warning information displayed in the second display region 10b continues to be displayed until the abnormality of the automatic two-wheeled vehicle is eliminated. In order to prevent the flashing display being stopped by an erroneous operation by the user, a configuration wherein the vehicle switch 4 is pressed continuously for a predetermined time may be adopted.

In the case of the warning display mode according to the first embodiment, the CPU 1 uses the background color adjustment unit to adjust the background color gradation of the second display region 10b to be the same as the background color gradation of the first display region 10a when a flashing display is stopped by the vehicle switch 4. Also, in the case of the warning display mode according to the second embodiment, the CPU 1 uses the background color adjustment unit to adjust the background color gradation and brightness of the second display region 10b to be the same as the background color gradation and brightness of the first display region 10a, and uses the backlight luminosity adjustment unit to adjust the backlight luminosity to a luminosity based on the external light brightness.

When the vehicle switch 4 is pressed and the backlight luminosity is changed from the luminosity of the warning display mode to a luminosity based on the external light brightness, the setting may be changed instantaneously when the backlight luminosity is to decrease, but when the backlight luminosity is to increase because of the change, the backlight luminosity is increased gradually in order that the driver is not dazzled.

Other than the vehicle switch 4, a method such that a touch panel installed in the display device is utilized, or a method such that the flashing display is stopped by a driver's voice being recognized, can be used as a method of stopping the flashing display of the background color of the second display region 10b.

According to the third embodiment, in addition to the same advantages as in the first embodiment and second embodiment, the flashing of the second display region 10b can be stopped when the driver notices a display of the warning information 13, whereby a reduction in power consumption is achieved. The embodiments can be freely combined, and each embodiment can be modified or abbreviated as appropriate, without departing from the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. An automatic two-wheeled vehicle display device, comprising:
   an indicator including a display region and a backlight that irradiates the display region with light, the display region including a first display region in which vehicle information is displayed and a second display region in which vehicle warning information is displayed; and
   a processor to adjust a luminosity of the backlight based on a brightness of external light detected by an illuminance sensor, adjust a gradation and a brightness of a background color of the display region of the indicator, acquire the vehicle warning information, and display the vehicle warning information in the second display region, wherein
   the processor, while the vehicle warning information is being displayed in the second display region, causes a background of the second display region, other than an image of the vehicle warning information in the second display region, to flash by repeatedly adjusting a gradation of a background color of the second display region to a first gradation that differs from a gradation of a background color of the first display region for a first setting period, and subsequently adjusting the gradation of the background color of the second display region to a second gradation that differs from the first gradation for a second setting period.

2. The automatic two-wheeled vehicle display device according to claim 1, wherein the first gradation and second gradation include gradations of each of colors red, green, and blue, and the background color of the second display region is determined in accordance with each gradation.

3. The automatic two-wheeled vehicle display device according to claim 2, wherein the first gradation is set so that the background color of the second display region becomes white, and the second gradation is set so that the background color of the second display region becomes black.

4. The automatic two-wheeled vehicle display device according to claim 1, wherein the first setting period is set to a length equal to or greater than that of the second setting period.

5. The automatic two-wheeled vehicle display device according to claim 1, wherein the processor, while the vehicle warning information is being displayed in the second display region, gradually increases the luminosity of the backlight in a third setting period that is shorter than the first setting period, and after the luminosity of the backlight reaches a predetermined maximum value, maintains the luminosity of the backlight at the predetermined maximum value for a fourth setting period that is a difference between the first setting period and the third setting period, and adjusts the luminosity of the backlight to another luminosity based on the brightness of the external light for the second setting period.

6. The automatic two-wheeled vehicle display device according to claim 5, wherein the processor, while the vehicle warning information is being displayed in the second display region, gradually increases the brightness of the background color of the second display region in the third setting period, and after the brightness of the background color reaches a predetermined maximum value, maintains the brightness of the background color of the second display region at the predetermined maximum value for the fourth setting period, and adjusts the brightness of the background color of the second display region to a predetermined minimum value for the second setting period.

7. The automatic two-wheeled vehicle display device according to claim 1, comprising a switch to stop the second display region from flashing according to a user input, wherein the processor adjusts the gradation of the background color of the second display region to be the same as the gradation of the background color of the first display region when the second display region stops flashing.

8. The automatic two-wheeled vehicle display device according to claim 5, comprising a switch to stop the second display region from flashing according to a user input, wherein the processor adjusts the gradation of the background color of the second display region to be the same as the gradation of the background color of the first display region, and adjusts the luminosity of the backlight to a luminosity based on the brightness of external light, when the second display region stops flashing.

* * * * *